Jan. 13, 1970  T. T. LUNDE ET AL  3,489,470
SELF-LUBRICATING SHEAVE BLOCKS

Filed May 2, 1968  2 Sheets-Sheet 1

INVENTORS
THOMAS T. LUNDE
RODERICK W. HARVEY
Eckhoff and Hoppe
ATTORNEYS

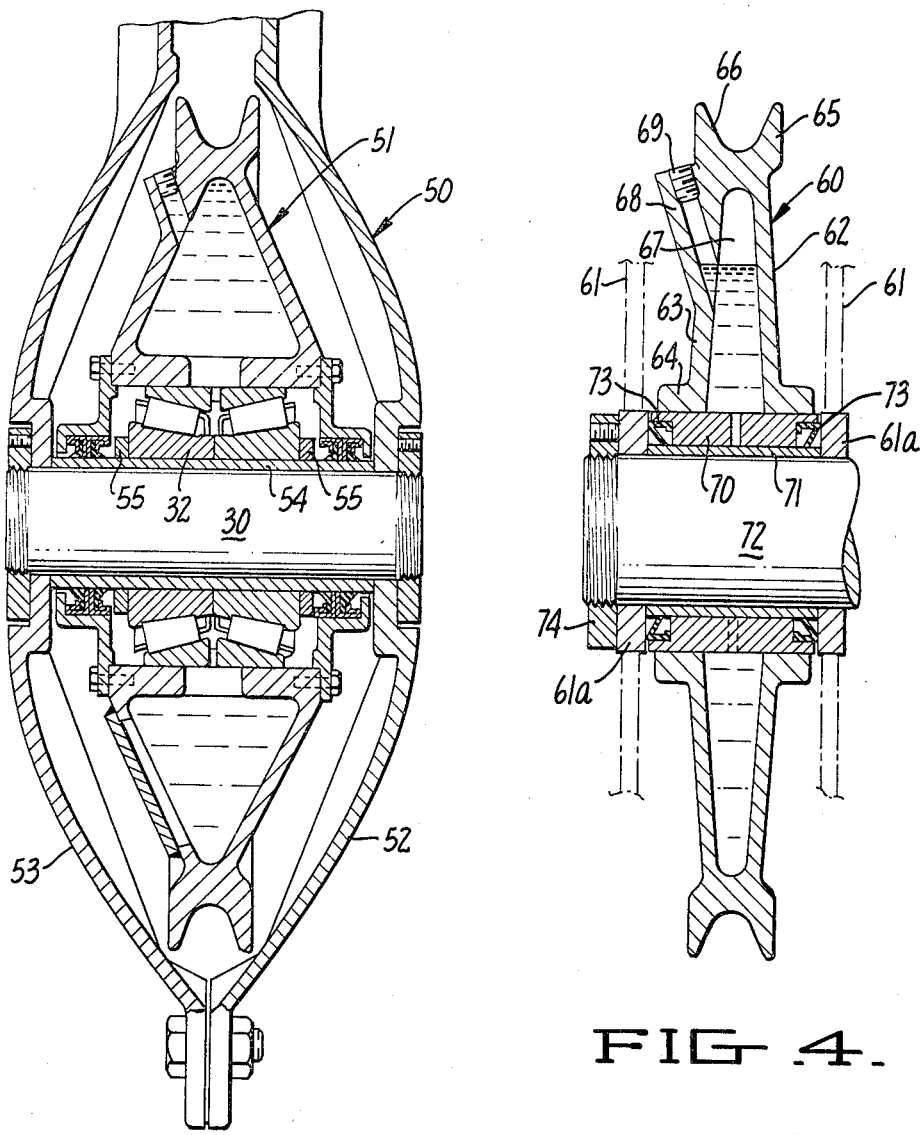

United States Patent Office 3,489,470
Patented Jan. 13, 1970

3,489,470
SELF-LUBRICATING SHEAVE BLOCKS
Thomas T. Lunde, 6 Locksley Ave., San Francisco, Calif. 94122, and Roderick Wesley Harvey, 1146 Keith Ave., Berkeley, Calif. 94708
Continuation-in-part of application Ser. No. 524,950, Feb. 3, 1966. This application May 2, 1968, Ser. No. 725,993
Int. Cl. F16c 1/24; F16h 57/04
U.S. Cl. 308—110    6 Claims

ABSTRACT OF THE DISCLOSURE

A self-lubricating sheave block comprising a sheave having an inner reservoir and a bearing means including a sleeve that permits testing of the sheave before it is assembled in a block. Means for supporting a sheave between the cheeks of a block comprising a bearing including a sleeve that extends axially through the sheave, said sleeve being in fluid communication with the reservoir and a lubricated area of bearing support, fluid seals being mounted in retainers secured on axially opposite ends of the sheave, and further including a removable support member extending through the sleeve and supported between the cheeks of the block, the removal of the support member allowing the sheave, together with the bearing, sleeve and fluid seals, to be disassembled intact from the block as an independent sub-assembly.

---

This invention relates to sheave constructions, particularly of the type having a reservoir for lubricating fluid.

This application is a continuation-in-part of our earlier filed co-pending application Ser. No. 524,950, filed Feb. 3, 1966, now abandoned.

In brief, the present invention involves a self-lubricating sheave block construction that provides constant lubrication for its bearing over long periods of time and which simplifies the in-field repair and maintenance of sheave blocks. More particularly, the invention contemplates the use of a sleeve member in association with a bearing and fluid seals to effect a fluid seal of both a fluid reservoir provided in the sheave and a lubricated area of bearing support. This construction allows the sheave and its bearing to be assembled together as an independent sub-assembly separate from the block, the reservoir in the sheave being filled with oil and the oil seal, bearing and sheave tested for oil tightness before mounting in a block. In addition, the sheave may be made in a modular form such that a plurality of sheaves may be ganged together upon a common support shaft, and yet each sheave may be replaced, together with its bearing, as a separate unit.

Although sheave blocks are presently known which may be properly described as self-lubricating, none are capable of being kept in service without maintenance for long periods of time. Therefore, one object of this invention is to provide a self-lubricating sheave block suitable for use in marine applications and other environments where frequent lubrication is necessary but where the blocks are not readily accessible and receive only irregular and infrequent lubrication.

Another object is to provide a self-lubricating sheave block that allows the sheave and its bearing to be assembled and tested as an independent sub-assembly for fluid tightness.

Another object is to provide a self-lubricating sheave having a fluid reservoir that may be filled with lubricating fluid and stored together with its bearing independent of the block to which it may later be assembled.

It is another object of the invention to provide sheaves of the kind described that may be ganged together and supported upon a common support shaft, each sheave being replaceable, together with its bearing, as a separate unit.

Another object is to provide a self-lubricating type sheave having a roller bearing that may be pre-loaded and tested as an independent sub-assembly.

A still further object of the invention is to provide a self-lubricating sheave block of the kind described which may be made in several parts, each part being formed from selected material that will provide superior quality of operation with a minimum of maintenance over long periods of time.

Other objects of this invention will become apparent in view of the following detailed description and the accompanying drawings.

In the drawings forming a part of this application and in which like parts are identified by like reference numerals throughout the same, FIG. 1 is a side elevation with a portion broken away showing a preferred embodiment of the invention in a self-lubricating sheave block;

FIG. 3 is a vertical transverse section of a second embodiment of the invention in a self-lubricating sheave block illustrating a second type of sheave and roller bearing construction; and FIG. 4 is a vertical transverse section of a third embodiment which utilizes a rigid, friction type bearing.

Figure 1:
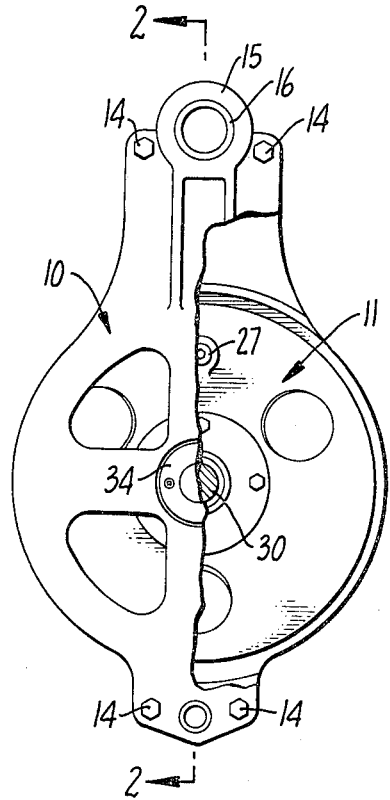
Figure 2:
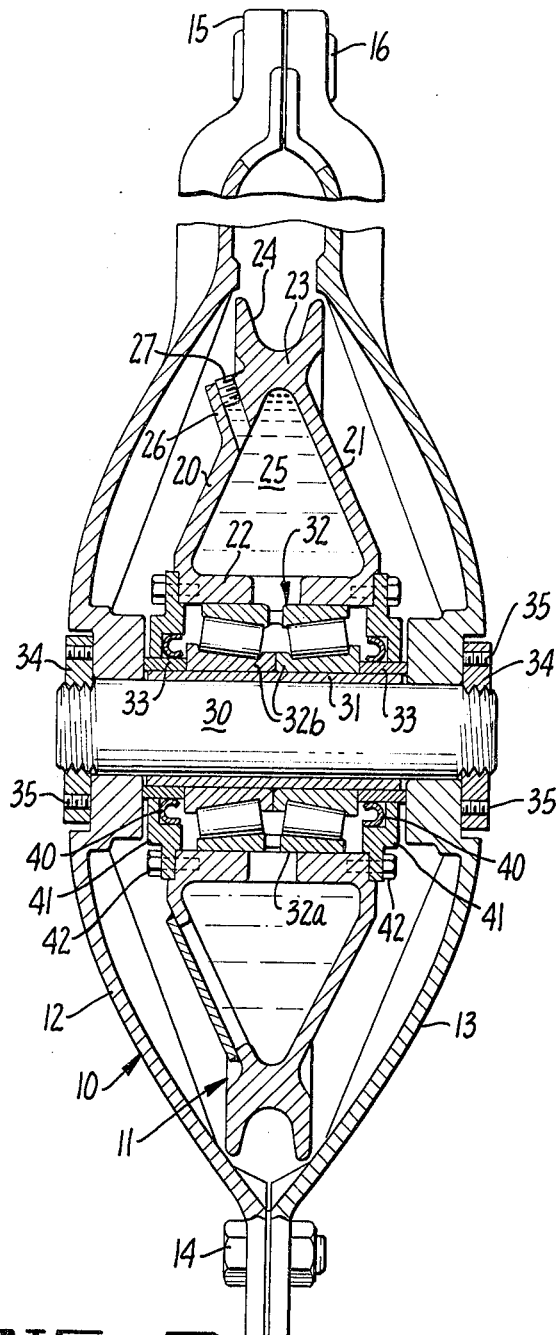
FIG. 2 is an enlarged vertical section of the sheave block shown in FIG. 1, said section being taken on lines 2—2.

Referring to FIGS. 1 and 2 in particular, there is shown a self-lubricating sheave block comprising a sheave frame 10 and a sheave 11. Frame 10 comprises a pair of cheeks 12 and 13 joined together by bolts 14, both top and bottom. The upper ends of the plates are formed with a swivel connection 15 having a pair of bushings 16 secured in place at opposite ends with a press fit.

This invention is more particularly directed to the construction of sheave 11 and the associated bearing structure that insures continuous lubrication of an area of bearing support over long periods of time. More particularly, sheave 11 is formed from a casting having sides 20 and 21 that extend radially outward from perforated hubs or collars 22. Sides 20 and 21 converge toward a rim 23 having a peripheral groove 24, and, together with the hub, they define an inner fluid reservoir 25 of generally triangular cross-section. This reservoir is filled with lubricating fluid that may be replenished through an opening formed in a boss 26, the opening being normally sealed with a removable pipe plug 27.

Sheave 11 is supported from frame 10 by a support pin 30, a sleeve 31 and a preloaded tapered roller bearing 32 comprised of a single piece outer race 32a and a two-piece inner race 32b. Inner races 32b are held together in a loaded condition by a pair of spacer rings 33, each ring being pressed onto sleeve 31 to effect an oil-tight seal therebetween. The total combined axial width of spacer rings 33 and inner races 32b is slightly greater than the axial length of sleeve 31, each spacer sleeve overlapping one end of the sleeve.

Pin 30, it will be noted, supports the sheave together with sleeves 31, spacer rings 33 and bearing 32 as an independent sub-assembly, the ends of the pin resting upon hubs forming a part of cheek plates 12 and 13. Retainer nuts 34, threaded upon the ends of pin 31, provide a clamping action that centers the sheave assembly between cheeks 12 and 13 and create a binding engagement between the ends of spacer rings 33 and the hub of the cheek plates. Such action prevents relative rotation between pin 30, sleeve 31, inner raceway 32b and spacer sleeves 33 while also maintaining an axial load upon bearings 32.

Retainer nuts 34 once threaded upon pin 30 are secured to cheek plates 12 and 13, respectively, by a plurality of set screws 35.

The lubricating system and bearing support described above is effectively sealed by a pair of fluid seals 40, each seal being received within an annular flange 41 mounted to sheave 11 by a plurality of bolts 42. Each flange 41 extends radially inward relative to hub 22, said flanges serving as a housing and retainer that positions each seal in peripheral contact with spacer rings 33, respectively.

A second embodiment of this invention, shown in FIG. 3, generally comprises a sheave frame 50 and a self-lubricating sheave 51. Frame 50 comprises a pair of cheek plates 52 and 53 joined together in the same manner as frame 10 of the first embodiment; and the same pin member 30 is utilized for supporting the sheave from the frame. The construction of sheave 51 and its assembly essentially differs from the first described embodiment in that a sleeve member 54 serves as the spacing means between the cheek plates of the frame. Nevertheless, a pair of rings 55 are secured to sleeve 54 on opposite sides of an identical roller bearing 32. These rings correspond to spacer rings 33 of the first described embodiment in that they are utilized to preload the bearing. Each ring 55 may be mounted to the sleeve with a press fit as were spacer rings 33 or, alternatively, they may be threaded thereon. Inasmuch as rings 55 do not contact the cheek plates, some care must be taken to be sure that the bearing is properly centered upon the spacer sleeve prior to loading the bearing with the rings. In most other respects, the construction for mounting sheave 51 is similar to that more particularly described in connection with FIGS. 1 and 2. Both constructions, it will be noted, permit the manufacture of a sheave, together with its bearing, as an independent sub-assembly; and each may be made with materials particularly selected for wear or strength characteristics. In this latter regard, sleeves 31 and 54 may be made of materials that are best capable of resisting wear and corrosion while support pin members 30 can be made of a material particularly selected for its high strength. For example, it is contemplated that spacer rings 33, retainer rings 55 and sleeves 31 and 54 may each be made of stainless steel or oven ceramic materials while pin members 30 may be selected from high strength steel that is plated with chromium. The use of high strength material for the support pin member is particularly desirable since it allows small diameter bearings to be used.

FIG. 4 of the drawing illustrates a self-lubricating sheave construction 60 that utilizes a rigid, friction bearing in lieu of the roller bearings employed with the embodiments of FIGS. 1, 2 and 3. Sheave 60 is mounted in a frame having parallel cheek plates 61 including hub portions 61a; and, like sheaves 11 and 51, it is made from a casting having sides 62 and 63 that extend radially outward from a hub or annular collar 64. The sides converge toward a rim 65 formed with a peripheral wire-receiving groove 66; and the sides, together with hub 64, define a fluid reservoir 67. This reservoir may be filled and replenished with oil through the threaded opening of a boss 68, although this opening is normally closed by a removable closure plug 69.

The bearing support of sheave 60 essentially comprises a pair of bearing sleeves 70 and 71 made of dissimilar metals and a support pin 72. Sleeves 70 and 71 are coaxially disposed between cheek plates 61, pin 72 being received through bearing sleeve 71. Sleeve 70 is preferably formed of a bearing metal, such as a magnesium-bronze alloy while sleeve 71 may be made of stainless steel. A plurality of radial openings formed through sleeve 70 provide fluid communication between the reservoir 67 and the bearing surfaces of sleeves 70 and 71.

A pair of annular seals 73 are provided for sealing the reservoir as well as the lubricated area of bearing support. Each seal 73 is disposed within an annular recess or counterbore formed in the ends of sleeve 70, each sleeve being confined in the recess by the hub portion 61a of cheek plate 61 and the outer surface of sleeve 71.

The various parts described above are assembled as follows: Bearing sleeve 70 is shrink-fitted into the hub 64 of sheave 60, thereby producing an effective oil seal between the sheave and bearing and insuring that both pieces rotate as a unit; oil seals 73 are pressed into the counterbore or recesses at the ends of sleeve 70; and sleeve 71 is inserted through the bearing bore of sleeve 70. Reservoir 67 is then filled to a predetermined level and the sheave, together with its bearing and oil seals, may be pressure-tested for leaks.

The sheave sub-assembly is mounted between cheek plates 61 in essentially the same manner as shown in FIGS. 2 and 3. A pair of sheave pin nuts 74 are threaded onto sheave pin 72 and tightened sufficiently to press the cheek plates against the ends of sleeve 71 with sufficient pressure to prevent rotation of the sleeve. The overall length of sleeve 71 necessarily exceeds the length of the bearing sleeve 70 so that when the sleeve 71 is clamped between the cheek plates, bearing sleeve 70 and sheave 60 are free to rotate relative to sleeve 71.

What is claimed is:

1. A self-lubricating sheave block comprising: a support frame and a sheave mounted thereon, said sheave having side walls that extend radially outward from a lubricated area of bearing support and define an inner reservoir for lubricating fluid; bearing means including a sleeve extending axially through said sheave in fluid communication with said reservoir and said lubricated area of bearing support; fluid seals mounted in retainers secured on axially opposite ends of the sheave; and support means extending through said sleeve and mounted to said frame for supporting said sheave, bearing means and fluid seals; whereby the fluid reservoir of said sheave may be filled with lubricating fluid and pretested prior to mounting upon said support frame.

2. The self-lubricating sheave block of claim 1, said bearing means further including a pair of roller bearings and a pair of spacer rings, each mounted on said sleeve, said spacer rings being disposed on opposite sides of said roller bearings, the combined width of said bearings and said spacer rings being greater than the length of said sleeve, said spacer rings being mounted to said sleeve and positioned thereon to place an axial load on the inner races of said bearings.

3. The self-lubricating sheave block of claim 2, the retainers for said fluid seal comprising a pair of seal retainer rings mounted to opposite sides of said sheave, one fluid seal being housed within each of said retainer rings, respectively, each seal being peripherally engaged with one of said spacer rings.

4. The self-lubricating sheave block of claim 1, said bearing means further including a pair of roller bearings and a pair of rings, each mounted on said sleeve, said rings being disposed on opposite sides of said roller bearings and secured to said sleeve to place an axial load on the inner races of said bearings.

5. The self-lubricating sheave block of claim 1, said bearing means further comprising a bearing ring of wear-resistant material having radial openings fluidly communicating the outer surface of said sleeve with the reservoir of said sheave, said bearing ring having annular recesses that define retainers for receiving and housing said fluid seals.

6. The self-lubricating sheave block of claim 1, said sleeve and support means being made of dissimilar metals, said sleeve being made of wear-resistant and corrosion-resistant material, said support means being made of high-strength material plated with chromium.

References Cited

FOREIGN PATENTS 349,426   4/1919   Germany.

MARTIN P. SCHWADRON, Primary Examiner

F. SUSKO, Assistant Examiner

U.S. Cl. X.R.

308—187, 191